United States Patent
Saida et al.

(10) Patent No.: US 8,948,546 B2
(45) Date of Patent: Feb. 3, 2015

(54) OPTICAL FREQUENCY SHIFTER AND OPTICAL MODULATOR USING THE SAME

(75) Inventors: Takashi Saida, Atsugi (JP); Hiroshi Yamazaki, Atsugi (JP); Takashi Goh, Atsugi (JP); Ken Tsuzuki, Atsugi (JP); Shinji Mino, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 30 days.

(21) Appl. No.: 13/984,480

(22) PCT Filed: Feb. 15, 2012

(86) PCT No.: PCT/JP2012/000976
§ 371 (c)(1),
(2), (4) Date: Aug. 8, 2013

(87) PCT Pub. No.: WO2012/111321
PCT Pub. Date: Aug. 23, 2012

(65) Prior Publication Data
US 2013/0315524 A1  Nov. 28, 2013

(30) Foreign Application Priority Data
Feb. 16, 2011 (JP) .................... 2011-031015

(51) Int. Cl.
*G02F 1/01* (2006.01)
*H04B 10/50* (2013.01)
(Continued)

(52) U.S. Cl.
CPC ............ *G02F 1/011* (2013.01); *H04B 10/5053* (2013.01); *H04B 10/548* (2013.01)
USPC ............. 385/3; 385/15; 385/42; 359/248

(58) Field of Classification Search
USPC .................... 385/2–4, 15–16, 42–44; 359/248
See application file for complete search history.

(56) References Cited

U.S. PATENT DOCUMENTS 6,539,131 B1   3/2003  Gill et al.
6,618,179 B2 *  9/2003  Kalluri et al. ............. 359/248
(Continued)

FOREIGN PATENT DOCUMENTS

JP   2003-098489   4/2003
JP   2005-121922   5/2005
(Continued)

OTHER PUBLICATIONS

International Search Report dated Mar. 19, 2012, issued in PCT Application No. PCT/JP2012/000976.
(Continued)

*Primary Examiner* — Akm Enayet Ullah
(74) *Attorney, Agent, or Firm* — Workman Nydegger

(57) ABSTRACT

An object of the present invention is to provide a temperature-independent optical frequency shifter for generating sub-carriers with a miniaturizable configuration, as well as to provide an all-optical OFDM modulator using the same that is compact, has low temperature dependence, and is even compatible with different frequency grids. Provided is an optical frequency shifter and an optical modulator using the same, the optical frequency shifter comprises one input optical port, a 1-input, 2-output optical coupler optically connected thereto, two Mach-Zehnder modulation units individually optically connected to the two outputs thereof, a 2-input, 2-output optical coupler optically connected to the individual outputs thereof, and two output optical ports optically connected to the outputs thereof, wherein the two Mach-Zehnder modulation units are driven by periodic waveforms at the same frequency whose phases differ from each other by $(2p+1)\pi/2$ (p: integer).

15 Claims, 14 Drawing Sheets

(51) Int. Cl.
*G02B 6/26* (2006.01)
*G02B 6/12* (2006.01)
*G02F 1/03* (2006.01)
*H04B 10/548* (2013.01)

(56) References Cited

U.S. PATENT DOCUMENTS

| | | | |
|---|---|---|---|
| 6,879,738 B2* | 4/2005 | Liu | 385/3 |
| 7,171,067 B2* | 1/2007 | Doerr et al. | 385/15 |
| 7,409,121 B2* | 8/2008 | Doerr et al. | 385/15 |
| 8,437,638 B2 | 5/2013 | Kobayashi et al. | |
| 2006/0093029 A1* | 5/2006 | Becker et al. | 375/239 |
| 2009/0034968 A1* | 2/2009 | Cherchi | 398/43 |
| 2012/0224812 A1* | 9/2012 | Inoue et al. | 385/42 |
| 2014/0301976 A1* | 10/2014 | Verner et al. | 424/85.2 |
| 2014/0314366 A1* | 10/2014 | Yamazaki et al. | 385/3 |

FOREIGN PATENT DOCUMENTS

| | | |
|---|---|---|
| JP | 2005-311722 | 11/2005 |
| JP | 2006-340188 | 12/2006 |
| JP | 2007-036390 | 2/2007 |
| JP | 2009-017320 | 1/2009 |
| JP | 2009-198914 | 9/2009 |

OTHER PUBLICATIONS

International Preliminary Report on Patentability and Written Opinion dated Aug. 29, 2013 received in related PCT application No. PCT/JP2012/000976.

* cited by examiner

US 8,948,546 B2

OPTICAL FREQUENCY SHIFTER AND OPTICAL MODULATOR USING THE SAME

TECHNICAL FIELD

The present invention relates to an optical frequency shifter and an optical modulator using the same, and more particularly, to an optical frequency shifter that shifts input continuous light into two optical frequencies, and an all-optical frequency-division multiplexing optical modulator using the same.

BACKGROUND ART

Due to vigorous communication demands, investigations towards increasing the capacity of backbone networks are being actively conducted. With increases in transmission capacity, if wavelength-division multiplexing (WDM) is used together with raising the per-wavelength symbol rate (the modulation symbol delivery speed), the effects of wavelength dispersion and polarization mode dispersion increase sharply. Furthermore, the optical intensity for obtaining a required reception sensitivity for transmission increases, and signal quality degradation due to four-wave-mixing, cross-phase modulation, self-phase modulation, and the like produced inside the optical fiber also become problematic.

In order to solve such problems, technology that uses orthogonal frequency-division multiplexing (OFDM) on each wavelength channel and multiplexes the above with WDM is being investigated as a multiplexing technology with excellent dispersion resistance and high bandwidth utilization efficiency. With OFDM, by encoding N carriers (where N is an integer equal to or greater than 2) orthogonal to each other, the symbol rate can be lowered to 1/N compared to the case of a single carrier, and the dispersion resistance can be improved. OFDM is a general-purpose technology in the field of radio.

As a technology that OFDM modulates an optical signal, there is a method that electrically generates an OFDM signal similarly to radio and drives an optical modulator (see PTL 1). The optical system is simple if this technique is used, but since the modulator and the modulator driving unit demand bands of approximately N times the symbol rate, there is a problem in that these bands become a limiting factor.

Meanwhile, all-optical OFDM that multiplexes sub-carrier light pre-modulated by an optical modulator has been proposed (see PTL 2 and 3). As illustrated in FIG. 1, first, multiple sub-carrier light beams are generated with a multi-carrier generation circuit (optical sub-carrier generator) 101. Next, these sub-carrier light beams are discriminated into individual sub-carrier light beams with an optical separation unit 102, and after being respectively data-modulated by optical orthogonal modulators 103a and 103b, are multiplexed by an optical multiplexer 104 to obtain a modulated output. As disclosed in PTL 3, the optical separation unit 102 may comprise delayed interferometers 105, 106a, and 106b. In so doing, a high extinction ratio can be obtained, even in the case where the optical frequency grid of the WDM signals (the optical frequency interval between WDM optical signals) and the sub-carrier interval differ to some degree. Although FIG. 1 illustrates the case of two sub-carriers, the optical circuit on the transmitting side is also comparatively simple in this case, and thus is promising as a next-generation high-speed transmission technology.

CITATION LIST

Patent Literature

PTL 1: Japanese Patent Laid-Open No. 2005-311722
PTL 2: Japanese Patent Laid-Open No. 2009-017320
PTL 3: Japanese Patent Laid-Open No. 2009-198914

SUMMARY OF INVENTION

Technical Problem

However, with the above configuration of the all-optical OFDM modulator, it is necessary to use delayed interferometers 105 and 106 in the optical separation unit 102 for the purpose of sub-carrier discrimination, and there is a problem in that the circuit size becomes larger for this reason. In order to set the frequency grid of the WDM to 100 GHz, it is necessary to set the free spectrum range (FSR) of the delayed interferometers to approximately 50 GHz (see PTL 3). If the delayed interferometers are manufactured with a silica optical waveguide (approximately N=1.49), the optical path differential of the delayed interferometers becomes approximately 4 mm. In order to set the frequency interval of the wavelength channels to the 50 GHz interval that is recently being adopted, the optical path differential becomes double at approximately 8 mm, which requires an optical separation unit with a large circuit size.

Also, since the lithium niobate waveguides or silica optical waveguides constituting the delayed interferometers typically have an index of refraction that is temperature-dependent, there is a problem in that the center wavelength of the delayed interferometers changes according to the environmental temperature. In order to resolve the above, it is necessary to perform temperature adjustment or make the delayed interferometers temperature-independent. Temperature adjustment complicates the implementation of the modulator module, and also has the problem increasing power consumption (typically several Watts). Temperature independence has the problem of inducing increased loss (typically around 1 dB).

Furthermore, since it is necessary to set the FSR of the delayed interferometers to match the optical frequency grid and the sub-carrier interval, it is necessary to modify the design of the delayed interferometers for different frequency grids, and there is a problem in that different optical separation units become necessary.

The present invention, being devised in light of related technology like the above, takes as an object to provide a temperature-independent optical frequency shifter that generates sub-carriers with a miniaturizable configuration, as well as to provide an all-optical OFDM modulator using the same that is compact, has low temperature dependence, and is even compatible with different frequency grids.

Solution to Problem

An optical frequency shifter of the first mode of the present invention for solving the above problem comprises one input optical port; a 1-input, 2-output optical coupler optically connected to the one input port; two Mach-Zehnder modulation units individually optically connected to the two outputs of the 1-input, 2-output optical coupler; a 2-input, 2-output optical coupler optically connected to the individual outputs of the two Mach-Zehnder modulation units; and two output optical ports optically connected to the two outputs of the 2-input, 2-output optical coupler; wherein the two Mach- Zehnder modulation units are driven by periodic waveforms at the same frequency whose phases differ from each other by $(2p+1)\pi/2$ (p: integer).

Also, an optical frequency shifter of the second mode is the optical frequency shifter of the first mode that the biases of the two Mach-Zehnder modulation units are adjusted such that the individual outputs become 0 when not driven.

Also, an optical frequency shifter of the third mode is the optical frequency shifter of the first mode that, provided that the half-wave voltage of the Mach-Zehnder modulation units is $V\pi$, the full voltage amplitude values of the periodic waveforms that drive the Mach-Zehnder modulation units are within 60% to 120% inclusive of $2V\pi$.

Also, an optical frequency shifter of the fourth mode is the optical frequency shifter of the first mode that the 1-input, 2-output optical coupler is a Y-optical branch coupler, and the 2-input, 2-output optical coupler is a 2-input, 2-output multimode interference optical coupler.

Also, an optical frequency shifter of the fifth mode is the optical frequency shifter of the first mode that a modulation electrode provided in one Mach-Zehnder modulation unit from between the two Mach-Zehnder modulation units and a modulation electrode provided in the other Mach-Zehnder modulation unit are cascade-connected, and a delay of $\pi/2$ in the periodic waveform is provided on an electrical line that connects the modulation electrode provided in the one Mach-Zehnder modulation unit and the modulation electrode provided in the other Mach-Zehnder modulation unit.

Also, an optical frequency shifter of the sixth mode is the optical frequency shifter of the fifth mode that the length of the modulation electrode provided in one Mach-Zehnder modulation unit from between the two Mach-Zehnder modulation units and of the modulation electrode provided in the other Mach-Zehnder modulation unit is shorter for the modulation electrode provided in the Mach-Zehnder modulation unit closer to the electrical input, and longer for the modulation unit provided in the Mach-Zehnder modulation unit farther from the electrical input.

Also, an optical modulator of the seventh mode of the present invention for solving the above problem is an optical modulator that generates an optical signal, the optical modulator comprising a 1-input, 2-output optical frequency shifter unit; two optical modulation units individually optically connected to the two outputs of the 1-input, 2-output optical frequency shifter unit; and an optical multiplexing unit optically connected to the individual outputs of the two optical modulation units; wherein the 1-input, 2-output optical frequency shifter unit is provided with one input optical port, a 1-input, 2-output optical coupler optically connected to the one input port, two Mach-Zehnder modulation units individually optically connected to the two outputs of the 1-input, 2-output optical coupler, a 2-input, 2-output optical coupler optically connected to the individual outputs of the two Mach-Zehnder modulation units, and two output optical ports optically connected to the two outputs of the 2-input, 2-output optical coupler, wherein the two Mach-Zehnder modulation units are driven by periodic waveforms at the same frequency whose phases differ from each other by $(2p+1)\pi/2$ (p: integer).

Also, an optical modulator of the eighth mode is the optical modulator of the seventh mode that the two modulation units are individual optical orthogonal modulation units, and the optical multiplexing unit is a 2-input, 1-output optical coupler.

Also, an optical modulator of the ninth mode is the optical modulator of in the seventh mode that the two modulation units are individual polarization multiplexing optical orthogonal modulation units, and the optical multiplexing unit is a 2-input, 1-output optical coupler.

Also, an optical modulator of the tenth mode is the optical modulator of the seventh mode that the two modulation units are double optical orthogonal modulation units individually optically connected to the two outputs of an individual 1-input, 2-output optical coupler and a 1-input, 2-output optical coupler, the optical multiplexer comprises a first 2-input, 1-output optical coupler that multiplexes one output from each of the two double optical orthogonal modulation units, a second 2-input, 1-output optical coupler that multiplexes the other output from each of the two double optical orthogonal modulation units, and a polarization multiplexer that polarization multiplexes the output of the first optical coupler and the output of the second optical coupler, and a polarization converter is provided between one of either the output of the first optical coupler and the output of the second optical coupler, and the polarization multiplexer.

Also, an optical modulator of the eleventh mode is the optical modulator of the seventh mode that the biases of the two Mach-Zehnder modulation units provided in the optical frequency shifter are adjusted such that the individual outputs become 0 when not driven.

Also, an optical modulator of the twelfth mode is the optical modulator of the seventh mode that, provided that the half-wave voltage of the Mach-Zehnder modulation units provided in the optical frequency shifter is $V\pi$, the full voltage amplitude values of the periodic waveforms that drive the Mach-Zehnder modulation units provided in the optical frequency shifter are within 60% to 120% inclusive of $2V\pi$.

Also, an optical modulator of the thirteenth mode the optical modulator of the seventh mode that the 1-input, 2-output optical coupler provided in the optical frequency shifter is a Y-optical branch coupler, and the 2-input, 2-output optical coupler provided in the optical frequency shifter is a 2-input, 2-output multimode interference optical coupler.

Also, an optical modulator of the fourteenth mode is the optical modulator of the seventh mode that a modulation electrode provided in one Mach-Zehnder modulation unit from between the two Mach-Zehnder modulation units provided in the optical frequency shifter and a modulation electrode provided in the other Mach-Zehnder modulation unit provided in the optical frequency shifter are cascade-connected, and a delay of $\pi/2$ in the periodic waveform that drives the optical frequency shifter is provided on an electrical line that connects the modulation electrode included in the one Mach-Zehnder modulation unit and the modulation electrode provided in the other Mach-Zehnder modulation unit provided in the optical frequency shifter.

Also, an optical modulator of the fifteenth mode is the optical modulator of the fourteenth mode that the length of a modulation electrode provided in one Mach-Zehnder modulation unit from between the two Mach-Zehnder modulation units provided in the optical frequency shifter and of the modulation electrode provided in the other Mach-Zehnder modulation unit is shorter for the modulation electrode provided in the Mach-Zehnder modulation unit closer to the electrical input, and longer for the modulation unit provided in the Mach-Zehnder modulation unit farther from the electrical input.

Advantageous Effects of Invention

By providing one input optical port; a 1-input, 2-output optical coupler optically connected to the one input port; two Mach-Zehnder modulation units individually optically connected to the two outputs of the 1-input, 2-output optical coupler; a 2-input, 2-output optical coupler optically connected to the individual outputs of the two Mach-Zehnder modulation units; and two output optical ports optically connected to the two outputs of the 2-input, 2-output optical coupler; and by driving the two Mach-Zehnder modulation units by periodic waveforms at the same frequency whose phases differ from each other by $\pi/2$, it is possible to provide an optical frequency shifter and an optical modulator that do not require delayed interferometers, are compact, do not have temperature dependency, and do not depend on a wavelength grid.

DESCRIPTION OF EMBODIMENTS

Hereinafter, embodiments of the present invention will be described with reference to the drawings and mathematical formulas.

First Embodiment

Figure 1:
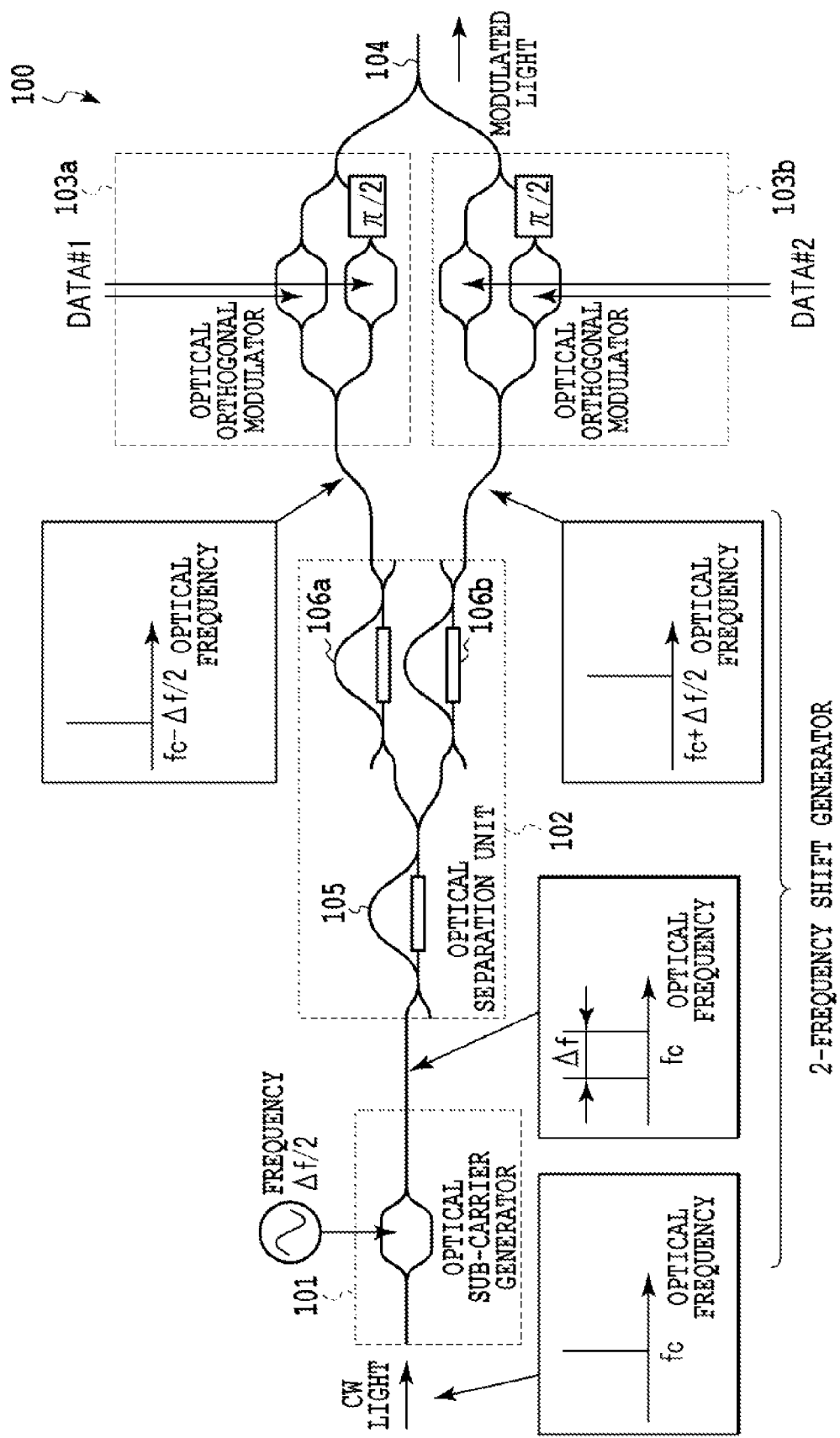
FIG. 1 is a diagram illustrating a configuration of an OFDM modulator of the related art.
Figure 2:
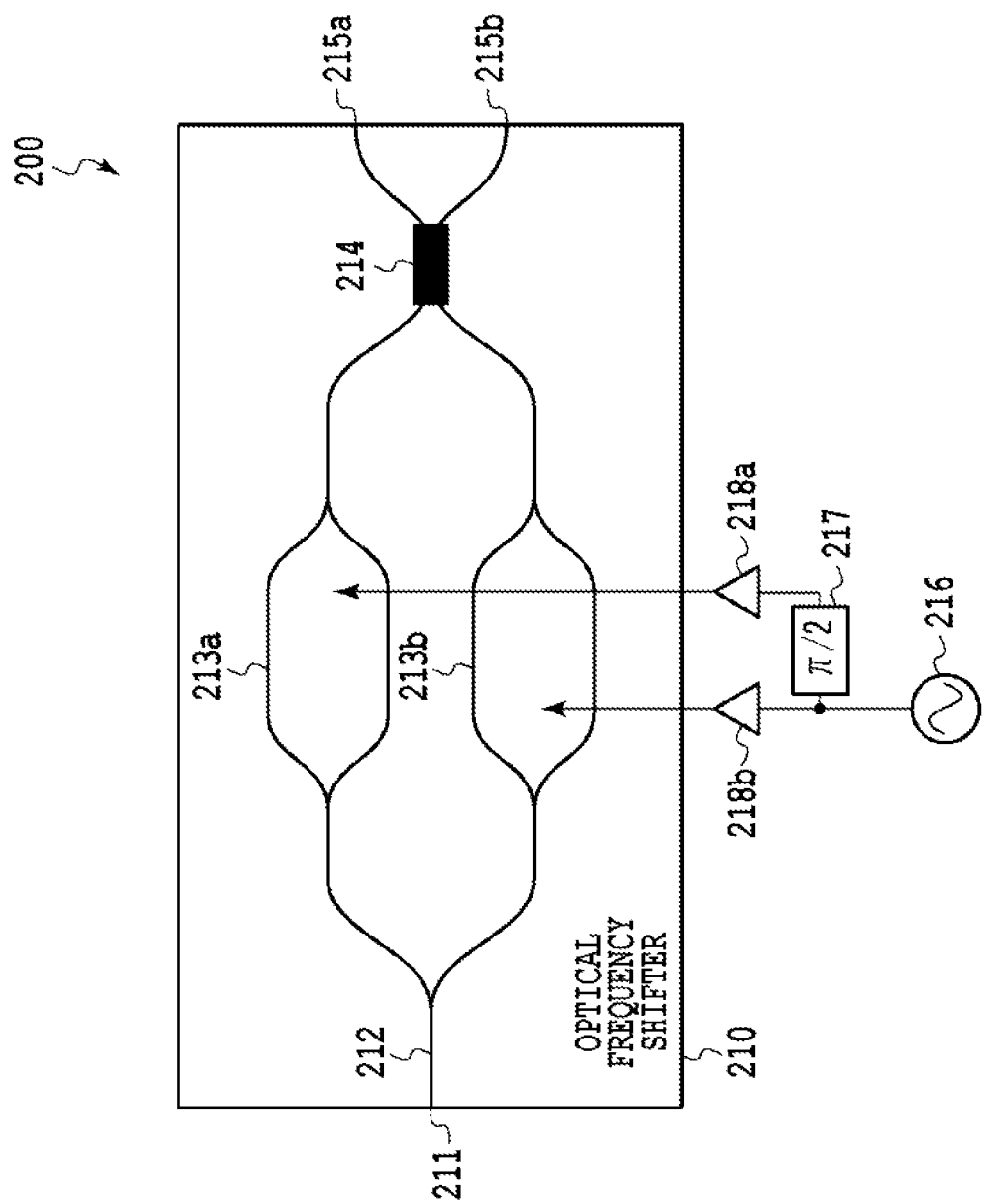
FIG. 2 is a diagram illustrating a configuration of an optical frequency shifter according to the first embodiment of the present invention.

FIG. 2 illustrates a configuration of an optical frequency shifter 210 according to the first embodiment of the present invention. The optical frequency shifter 210 of the first embodiment of the present invention comprises an input port 211, a 1-input, 2-output optical coupler 212 optically connected to the input port 211, two Mach-Zehnder modulation units (hereinafter, MZ modulation units) 213a and 213b respectively and optically connected to the two outputs of the optical coupler 212, a 2-input, 2-output optical coupler 214 individually and optically connected to the two MZ modulation units 213a and 213b, and output optical ports 215a and 215b individually and optically connected to the two outputs of the 2-input, 2-output optical coupler 214.

The two MZ modulation units 213a and 213b are driven via electrical amps 218a and 218b by electrical signals produced by a signal generator 216, but as illustrated in FIG. 2, the driving unit of the MZ modulation unit 213a is provided with an electrical delay line 217 having a phase shift of $\pi/2$. As a result, the two MZ modulation units 213a and 213b become driven by identical electrical waveforms whose phase differs by $\pi/2$.

Herein, in the optical frequency shifter 210 according to the first embodiment of the present invention illustrated in FIG. 2, a Y-optical branch coupler is used as the 1-input, 2-output optical coupler 212. This is because taking such a configuration makes it possible to provide a 1-input, 2-output optical coupler with a wide range of operating wavelengths and small splitting ratio instability. However, the present invention is not limited to this example, and for the 1-input, 2-output optical coupler, a 1-input, 2-output multimode interference optical coupler may also be used, and additionally a directional coupler, a 2-input, 2-output multimode interference optical coupler, or one of the input ports of a 2-input, 2-output optical coupler such as an asymmetric X-coupler may also be used.

Also, in the optical frequency shifter 210 according to the first embodiment of the present invention illustrated in FIG. 2, a multimode interference optical coupler is used as the 2-input, 2-output optical coupler 214. This is because taking such a configuration makes it possible to provide a 2-input, 2-output optical coupler with a wide range of operating wavelengths. However, the present invention is not limited to this example, and obviously the use of another coupler, such as a directional coupler, an asymmetric X-coupler, or a wideband optical coupler using a lattice configuration, is also acceptable.

Also, in the optical frequency shifter 210 according to the first embodiment of the present invention illustrated in FIG. 2, a Y-optical branch coupler with two in-phase optical outputs is used as the 1-input, 2-output optical coupler 212, and a multimode interference optical coupler that produces a 90 degree phase difference between two optical outputs is used as the 2-input, 2-output optical coupler 214. This is not only because a Y-optical branch coupler and a multimode interference optical coupler are suitable as the respective couplers for the first embodiment of the present invention, but also because taking such a combination also has the merit of making it unnecessary to insert an optical delay in the optical arm coupling the Y-optical branch coupler 212 and the multimode interference optical coupler 214. However, as illustrated in detail in a modification of the first embodiment, the present invention is not limited to this example.

Next, operation of the optical frequency shifter 210 according to the first embodiment of the present invention will be described. Herein, an input waveform into the optical frequency shifter 210 is expressed as E=E0(t). At this point, since input light is guided by the Y-optical branch coupler 212 to the MZ modulation units 213a and 213b while keeping the same phase, the input optical fields Eain(t) and Ebin(t) of the MZ modulation units 213a and 213b are respectively expressed as in Eq. 1 and Eq. 2 below.

Math. 1

$$E_a^{in}(t) = \frac{1}{\sqrt{2}} E_0(t) \quad \text{Eq. 1}$$

Math. 2

$$E_b^{in}(t) = \frac{1}{\sqrt{2}} E_0(t) \quad \text{Eq. 2}$$

At this point, the driving waveform Db(t) of the MZ modulation unit 213b is expressed as in Eq. 3 below, assuming a sine wave for simplicity.

Math. 3

$$D_b(t) = m\sin(2\pi ft) \quad \text{Eq. 3}$$

Herein, m is a proportionality coefficient, and f is the frequency of the driving waveform. The driving waveform Da(t) of the MZ modulation unit 213a receives a delay of π/2 from the electrical delay line 217, and thus becomes like Eq. 4 below.

Math. 4

$$D_a(t) = m\sin\left[2\pi f\left(t - \frac{1}{4f}\right)\right] \quad \text{Eq. 4}$$

Now assume that the MZ modulation units 213a and 213b are bias-adjusted so as to indicate a sinusoidal response to the respective driving waveforms. At this point, the optical field outputs Eaout(t) and Ebout(t) of the MZ modulation units 213a and 213b are respectively expressed as in Eq. 5 and Eq. 6 below.

Math. 5

$$E_a^{out}(t) = \frac{1}{\sqrt{2}} E_0 \sin\left\{m\sin\left[2\pi f\left(t - \frac{1}{4f}\right)\right]\right\} \quad \text{Eq. 5}$$

$$= \frac{2}{\sqrt{2}} E_0 \sum_{n=0}^{\infty} J_{2n+1}(m)\sin\left[2\pi(2n+1)f\left(t - \frac{1}{4f}\right)\right]$$

Math. 6

$$E_b^{out}(t) = \frac{1}{\sqrt{2}} E_0 \sin[m\sin(2\pi ft)] \quad \text{Eq. 6}$$

$$= \frac{2}{\sqrt{2}} E_0 \sum_{n=0}^{\infty} J_{2n+1}(m)\sin[2\pi(2n+1)ft]$$

Herein, Jn is an nth order Bessel function of the first kind. These two optical fields are multiplexed by the multimode interference optical coupler 214. At this point, in the multimode interference optical coupler 214, the combined light is given a phase shift of π/2, and thus the optical fields E1(t) and E2(t) obtained from the output ports 215a and 215b are respectively given as in Eq. 7 and Eq. 8 below.

Math. 7

$$E_1(t) = \quad \text{Eq. 7}$$

$$E_0 \sum_{n=0}^{\infty} J_{2n+1}(m)\left\{\sin\left[2\pi(2n+1)f\left(t - \frac{1}{4f}\right)\right] + j\sin[2\pi(2n+1)ft]\right\}$$

Math. 8

$$E_2(t) = \quad \text{Eq. 8}$$

$$E_0 \sum_{n=0}^{\infty} J_{2n+1}(m)\left\{j\sin\left[2\pi(2n+1)f\left(t - \frac{1}{4f}\right)\right] + \sin[2\pi(2n+1)ft]\right\}$$

Expanding further, Eq. 9 and Eq. 10 below can be obtained.

Math. 9

$$E_1(t) = -E_0 \sum_{n=0}^{\infty} J_{2n+1}(m)(-1)^n \exp[-(-1)^n 2\pi(2n+1))ft] \quad \text{Eq. 9}$$

Math. 10

$$E_2(t) = -jE_0 \sum_{n=0}^{\infty} J_{2n+1}(m)(-1)^n \exp[(-1)^n 2\pi(2n+1))ft] \quad \text{Eq. 10}$$

Ignoring the higher-order terms and focusing on the n=0 term, E1(t) and E2(t) respectively become like Eq. 11 and Eq. 12 below.

Math. 11

$$E_1(t) \approx -E_0 J_1(m)\exp(-j2\pi ft) \quad \text{Eq. 11}$$

Math. 12

$$E_2(t) \approx -jE_0 J_1(m)\exp(+j2\pi ft) \quad \text{Eq. 12}$$

Eq. 11 and Eq. 12 above demonstrate that E1(t) is given a frequency shift of −f from the original frequency, while E2(t) is given a frequency shift of +f from the original frequency.

Herein, in the optical frequency shifter 210 according to the first embodiment of the present invention illustrated in FIG. 2, the driving waveform Da(t) of the MZ modulation unit 213a is taken to receive a delay of π/2 from the electrical delay line 217, but obviously it is also acceptable to provide the electrical delay line 217 on the side of the MZ modulation unit 213b and apply the π/2 delay to the driving waveform Db(t). In this case, f indicated in the formulas is replaced with −f. Furthermore, generally the advantageous effects of the present invention can be exhibited if a phase difference of (2p+1) π/2 is applied between Da(t) and Db(t), where p is an integer.

Also, in the optical frequency shifter 210 according to the first embodiment of the present invention illustrated in FIG. 2, the driving waveforms Da(t) and Db(t) of the MZ modulation units 213a and 213b are assumed to be sine waves, but this is because the generation of such waveforms is easy, and furthermore because the load on the driving electrical system can be reduced since the waveform is narrow. However, the present invention is not limited to this example, and obviously a waveform other than a sine wave is also acceptable. In this case, the coefficients applied to the Bessel functions in Eq. 9 and Eq. 10 will change.

Figure 3:
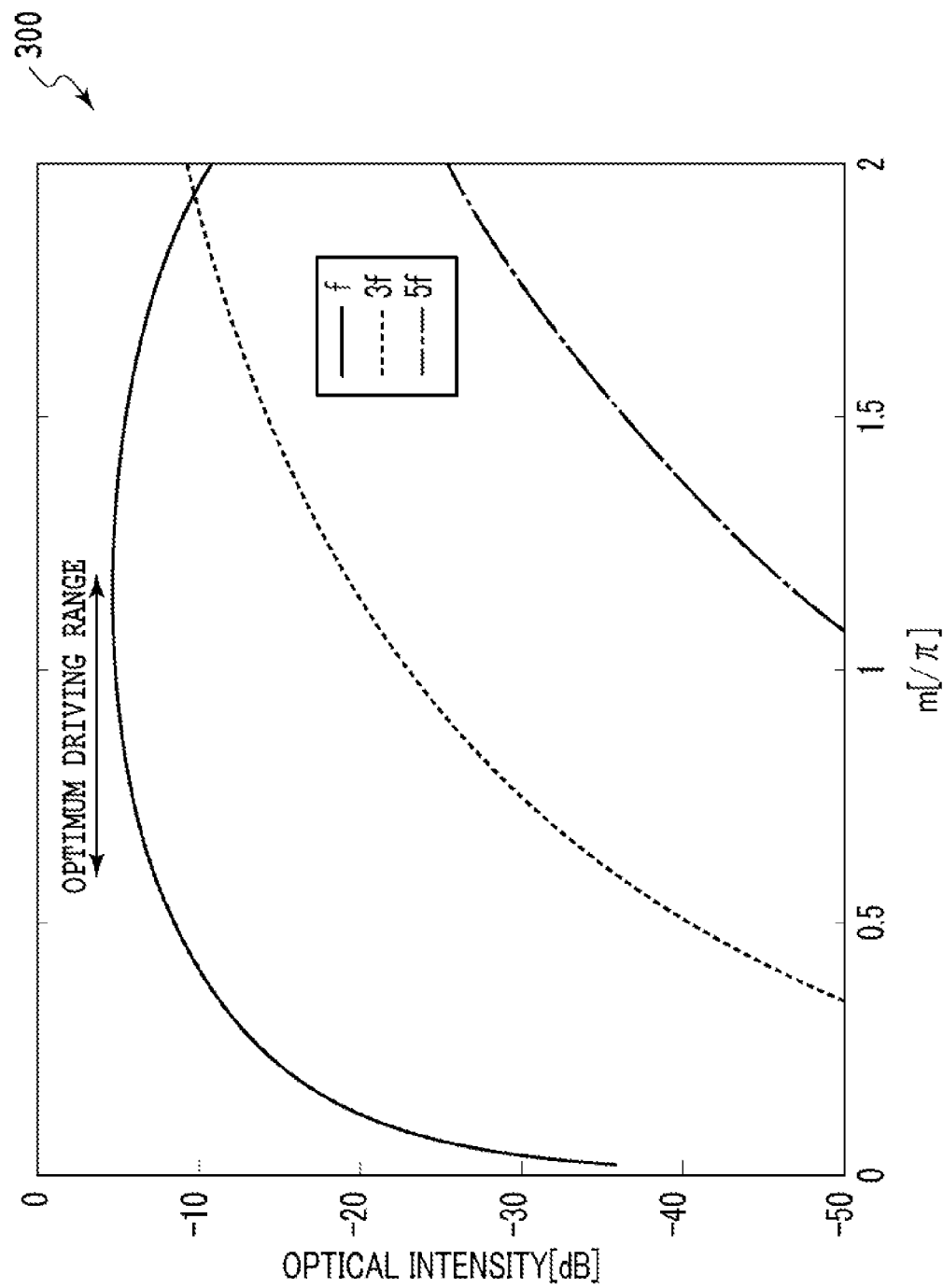
FIG. 3 is a diagram illustrating modulation amplitude dependence of frequency shift components in an optical frequency shifter according to the first embodiment of the present invention.

FIG. 3 is a diagram illustrating the relationship 300 between the driving amplitude m of an optical frequency shifter according to the first embodiment of the present invention, and the obtained optical frequency components. In the drawing, an f component, a 3f component, and a 5f component are depicted. Of these, the f component becomes important for the operation of the optical frequency shifter, and the drawing demonstrates that the f component is maximized when m=1.17π. Meanwhile, since there is an aspect of the load on the driving electrical system increasing as the driving amplitude increases, a driving amplitude m from 60% to 120% of π is desirable. This is equivalent to setting the full amplitude from 60% to 120% of 2Vπ, provided the half-wave voltage of an MZ modulation unit is Vπ.

Figure 4:
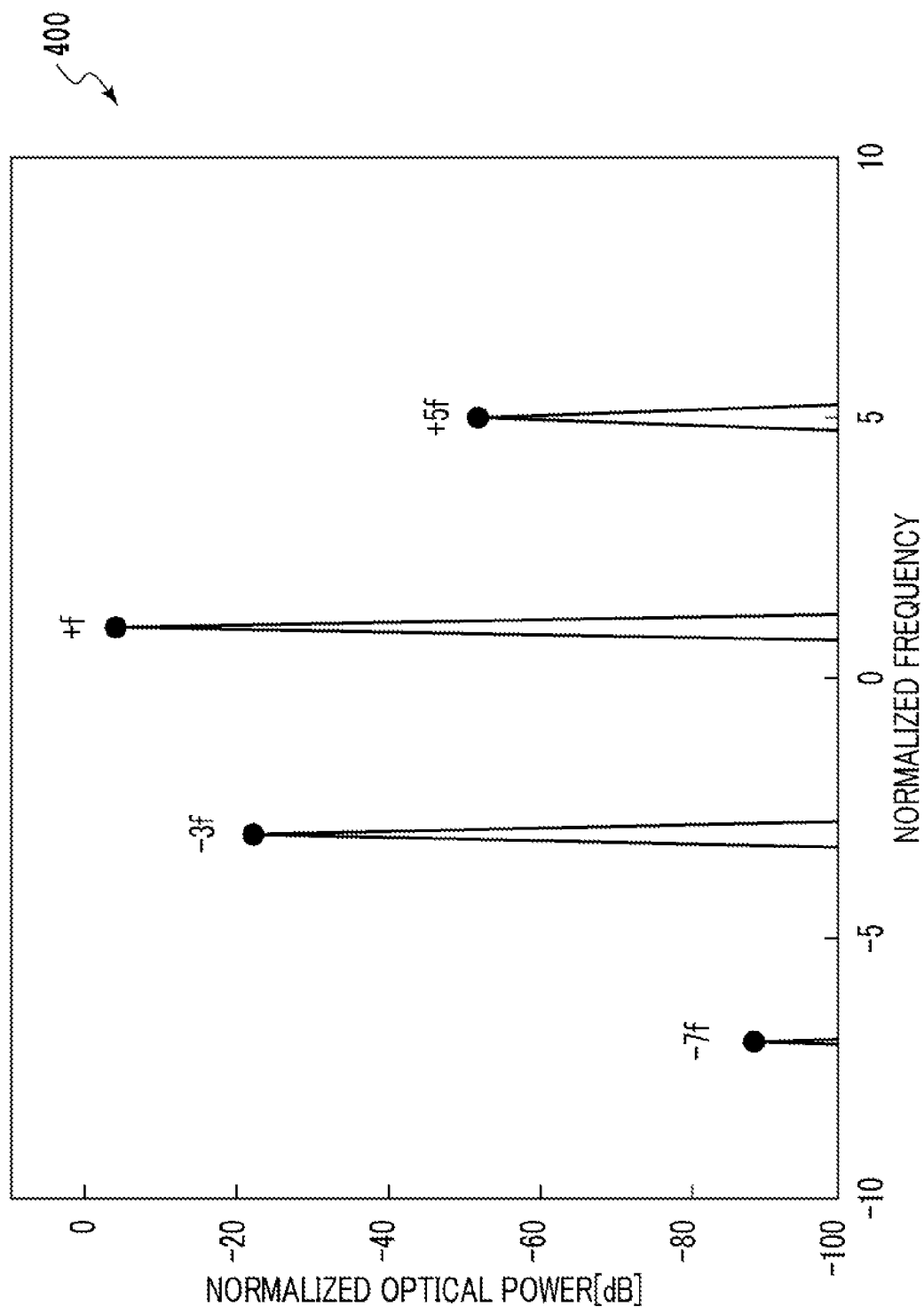
FIG. 4 is a diagram illustrating frequency shift components in an optical frequency shifter according to the first embodiment of the present invention.

FIG. 4 is a diagram illustrating the results 400 of calculating the optical frequency spectrum obtained at the output optical port 215b when driving an optical frequency shifter according to the first embodiment of the present invention. The horizontal axis represents the optical frequency normalized to f, while the vertical axis is the optical power. Also, the driving amplitude m is taken to be 1.17π. Eq. 10 demonstrates that the optical frequency after passing through the optical frequency shifter becomes +f, −3f, +5f, −7f, and so on.

Figure 5:
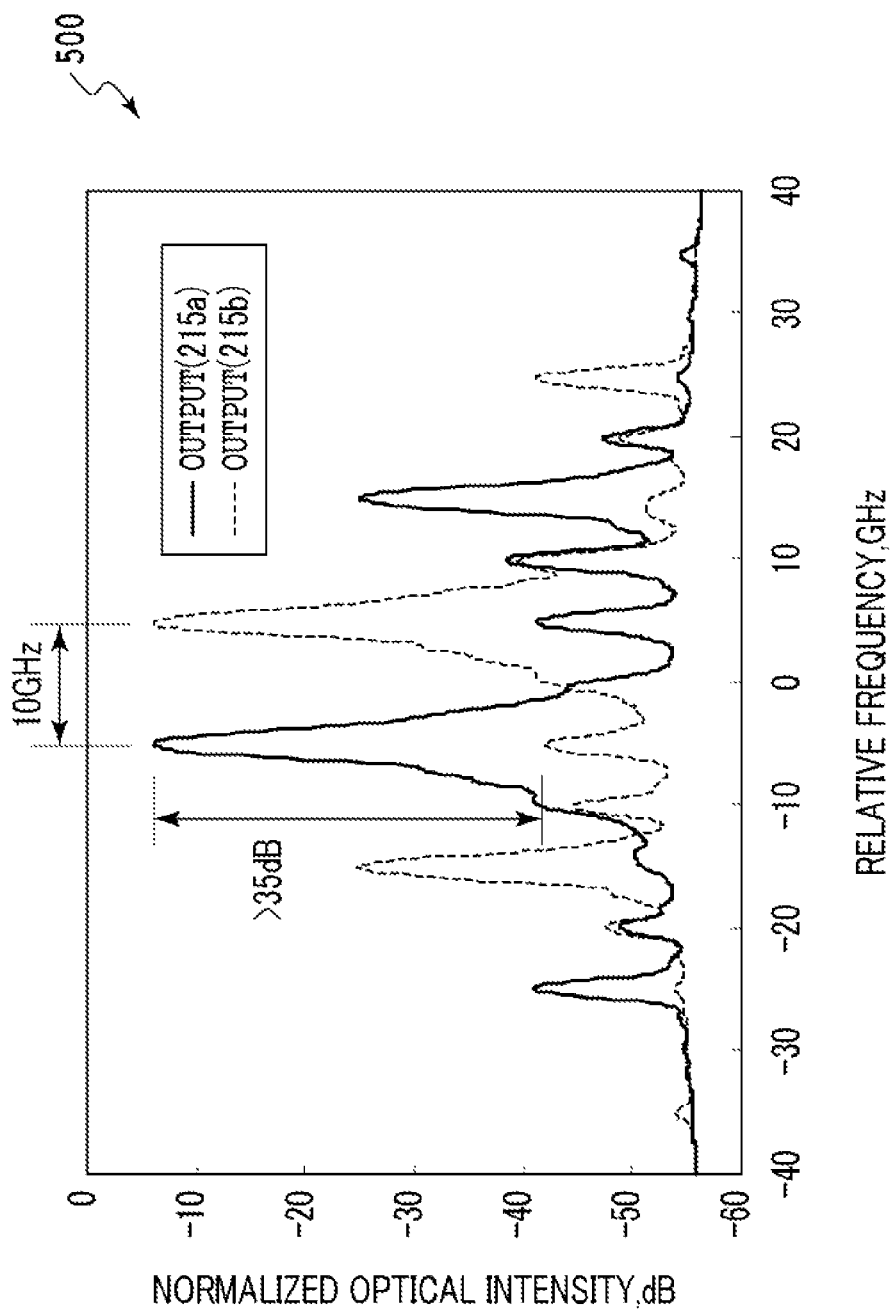
FIG. 5 is a diagram illustrating an output signal obtained with an optical frequency shifter according to the first embodiment of the present invention.

FIG. 5 is a diagram illustrating a waveform 500 obtained when configuring an optical frequency shifter according to the first embodiment of the present invention and actually driving. FIG. 5 demonstrates that by using an optical frequency shifter of the present invention, output whose optical frequency is respectively shifted by −f and +f is obtained at the output optical ports 215a and 215, respectively.

With this configuration, optical delayed interferometers for discriminating the ±f optical frequency components become unnecessary, thus making it possible to provide an optical frequency shifter of small size, in which it is unnecessary to take into account changes in the characteristics of the delayed interferometers due to temperature. In addition, since there are no optical delayed interferometers, it is possible to provide an optical frequency shifter that is not limited to operation on a specific wavelength grid, but is capable of operating on any frequency grid.

Modification of First Embodiment

Figure 6:
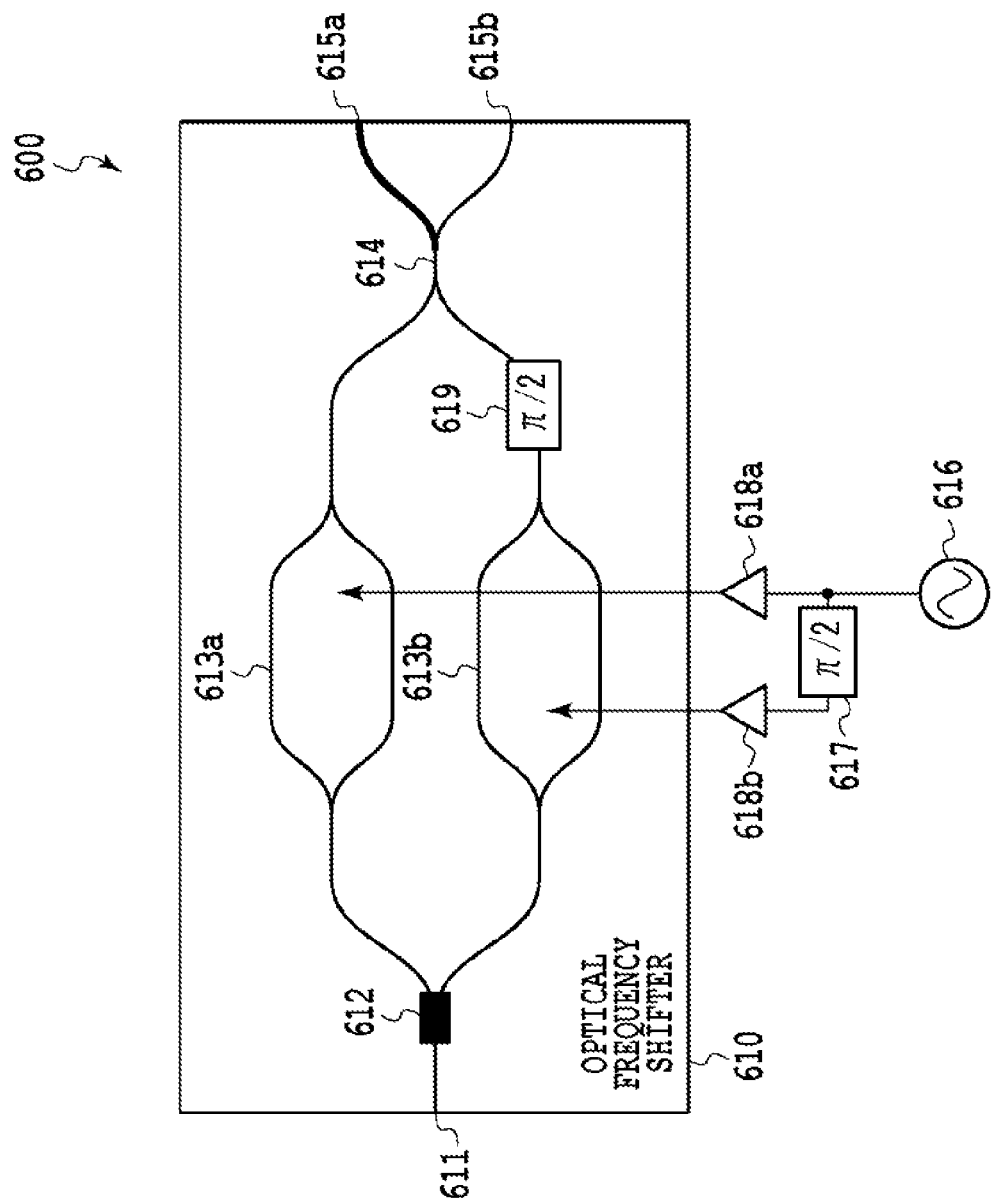
FIG. 6 is a diagram illustrating a configuration of an optical frequency shifter according to a modification of the first embodiment of the present invention.

FIG. 6 illustrates a configuration of an optical frequency shifter 610 according to a modification of the first embodiment of the present invention. The optical frequency shifter 610 according to a modification of the first embodiment of the present invention comprises an input port 611, a 1-input, 2-output optical coupler 612 optically connected to the input port 611, two Mach-Zehnder modulation units (hereinafter, MZ modulation units) 613a and 613b individually and optically connected to the two outputs of the optical coupler 612, a 2-input, 2-output optical coupler 614 individually and optically connected to the two MZ modulation units 613a and 613b, and output optical ports 615a and 615b individually and optically connected to the two outputs of the 2-input, 2-output optical coupler 614.

The two MZ modulation units 613a and 613b are driven via electrical amps 618a and 618b by electrical signals produced by a signal generator 616, but as illustrated in FIG. 6, the driving unit of the MZ modulation unit 613b is provided with an electrical delay line 617 having a phase shift of π/2. As a result, the two MZ modulation units 613a and 613b become driven by identical electrical waveforms whose phase differs by π/2. In the optical frequency shifter according to the first embodiment of the present invention illustrated in FIG. 2, the electrical delay line 217 is provided on the driving system of the MZ modulation unit 213a, but obviously the advantageous effects of the present invention can be exhibited even if the electrical delay line 617 is provided for the driving unit of the MZ modulation unit 613b, as with the optical frequency shifter 610 according to a modification of the first embodiment of the present invention illustrated in FIG. 6.

Also, in the optical frequency shifter 610 according to a modification of the first embodiment of the present invention illustrated in FIG. 6, a 1-input, 2-output multimode interference optical coupler is used as the 1-input, 2-output optical coupler 612. In the optical frequency shifter 210 according to the first embodiment of the present invention illustrated in FIG. 2, a Y-optical branch coupler is used as the 1-input, 2-output optical coupler 212, but obviously the advantageous effects of the present invention can be exhibited even if a 1-input, 2-output multimode interference optical coupler is used as the 1-input, 2-output optical coupler 612, as with the optical frequency shifter 610 according to a modification of the first embodiment of the present invention illustrated in FIG. 6.

Furthermore, in the optical frequency shifter 610 according to a modification of the first embodiment of the present invention illustrated in FIG. 6, a 2-input, 2-output X-coupler having outputs with different waveguide widths as illustrated in FIG. 6 is used as the 2-input, 2-output optical coupler 614. This is because an X-coupler that uses adiabatic mode evolution has low-loss characteristics over a wide band, making it possible to provide a wideband, low-loss optical frequency shifter. In addition, since with an X-coupler the phases between the combined light become 0 and π, a π/2 optical delay line 619 is inserted between the MZ modulation unit 613b and the 2-input, 2-output optical coupler 614 in order to compensate. In the optical frequency shifter 210 according to the first embodiment of the present invention illustrated in FIG. 2, a 2-input, 2-output multimode interference optical coupler is used as the 2-input, 2-output optical coupler 214, but obviously the advantageous effects of the present invention can be exhibited even if an X-coupler is used as the 2-input, 2-output optical coupler 614, and an optical delay line 619 is used to compensate for the phase, as with the optical frequency shifter 610 according to a modification of the first embodiment of the present invention illustrated in FIG. 6.

Second Embodiment

Figure 7:
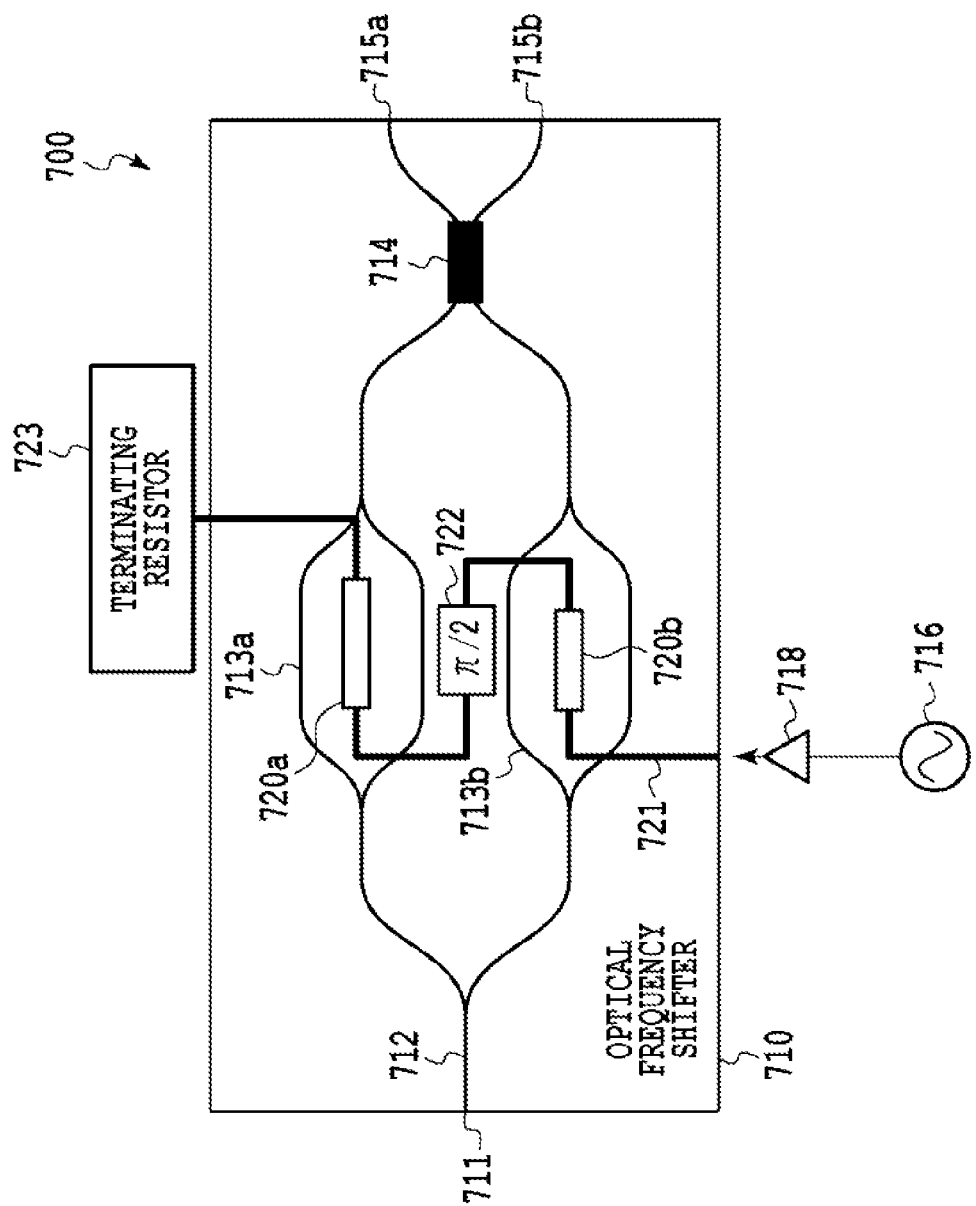
FIG. 7 is a diagram illustrating a configuration of an optical frequency shifter according to the second embodiment of the present invention.

FIG. 7 illustrates a configuration of an optical frequency shifter 710 according to the second embodiment of the present invention. The optical frequency shifter 710 of the second embodiment of the present invention comprises an input port 711, a 1-input, 2-output optical coupler 712 optically connected to the input port 711, two MZ modulation units 713a and 713b individually and optically connected to the two outputs of the optical coupler 712, a 2-input, 2-output optical coupler 714 individually and optically connected to the two MZ modulation units 713a and 713b, and output optical ports 715a and 715b individually and optically connected to the two outputs of the 2-input, 2-output optical coupler 714.

Herein, in the optical frequency shifter 710 according to the second embodiment of the present invention illustrated in FIG. 7, two MZ modulation units 713a and 713b are provided. The two MZ modulation units 713a and 713b are individually equipped with modulation electrodes 720a and 720b. These modulation electrodes 720a and 720b are connected by an electrical line 721, with an electrical delay line 722 provided between the modulation electrodes 720a and 720b such that an electrical delay of π/2 is applied between the driving waveforms of the modulation electrodes 720a and 720b. In addition, the electrical line 721 connecting the modulation electrodes 720a and 720b is ultimately terminated by a terminating resistor 723. The optical frequency shifter 710 is driven via an electrical amp 718 by a driving waveform generated by a signal generator 716. With this configuration, one electrical amp is sufficient to drive the MZ modulation units, making it possible to provide an optical frequency shifter 710 with low power consumption.

Herein, it is noted that although modulation electrodes are obviously also provided in the MZ modulation units 213a, 613a and 213b, 613b included in the optical frequency shifter 210 according to the first embodiment of the present invention and the optical frequency shifter 610 according to a modification of the first embodiment of the present invention illustrated in FIG. 2 and FIG. 6, modulation electrodes are omitted from FIG. 2 and FIG. 6 which illustrate configurations.

In addition, in the optical frequency shifter 710 according to the second embodiment of the present invention illustrated in FIG. 7, the MZ modulation units 713a and 713b comprise x-cut lithium niobate, and the modulation electrodes 720a and 720b are single-electrode driving electrodes. However, the present invention is not limited to this example, and the MZ modulation units 713a and 713b may comprise z-cut lithium niobate and polarization inversion, and the modulation electrodes 720a and 720b may be single-electrode driving electrodes. Alternatively, the MZ modulation units 713a and 713b may comprise z-cut lithium niobate, and the modulation electrodes 720a and 720b may be dual-electrode driving electrodes. Obviously, MZ modulation units 713a and 713b comprised of other types of materials are also acceptable.

In addition, in the optical frequency shifter 710 according to the second embodiment of the present invention illustrated in FIG. 7, the length of the modulation electrode 720b closer to the electrical input may be made shorter than the length of the modulation electrode 720a farther from the electrical input in order to account for loss on the electrical line from the modulation electrode 720b to the modulation electrode 720a and obtain the same degree of modulation with the MZ modulation units 713a and 713b. However, the present invention is not limited to this example.

Furthermore, in the optical frequency shifter 710 according to the second embodiment of the present invention illustrated in FIG. 7, a Y-optical branch coupler is used as the 1-input, 2-output optical coupler 712. This is because taking such a configuration makes it possible to provide a 1-input, 2-output optical coupler with a wide range of operating wavelengths and a small splitting ratio instability. However, the present invention is not limited to this example, and for the 1-input, 2-output optical coupler, a 1-input, 2-output multimode interference optical coupler may also be used, and additionally a directional coupler, a 2-input, 2-output multimode interference optical coupler, or one of the input ports of a 2-input, 2-output optical coupler such as an asymmetric X-coupler may also be used.

Also, in the optical frequency shifter 710 according to the second embodiment of the present invention illustrated in FIG. 7, a multimode interference optical coupler is used as the 2-input, 2-output optical coupler 714. This is because taking such a configuration makes it possible to provide a 2-input, 2-output optical coupler with a wide range of operating wavelengths. However, the present invention is not limited to this example, and obviously the use of another coupler, such as a directional coupler, an asymmetric X-coupler, or a wideband optical coupler using a lattice configuration, is also acceptable.

Figure 8:
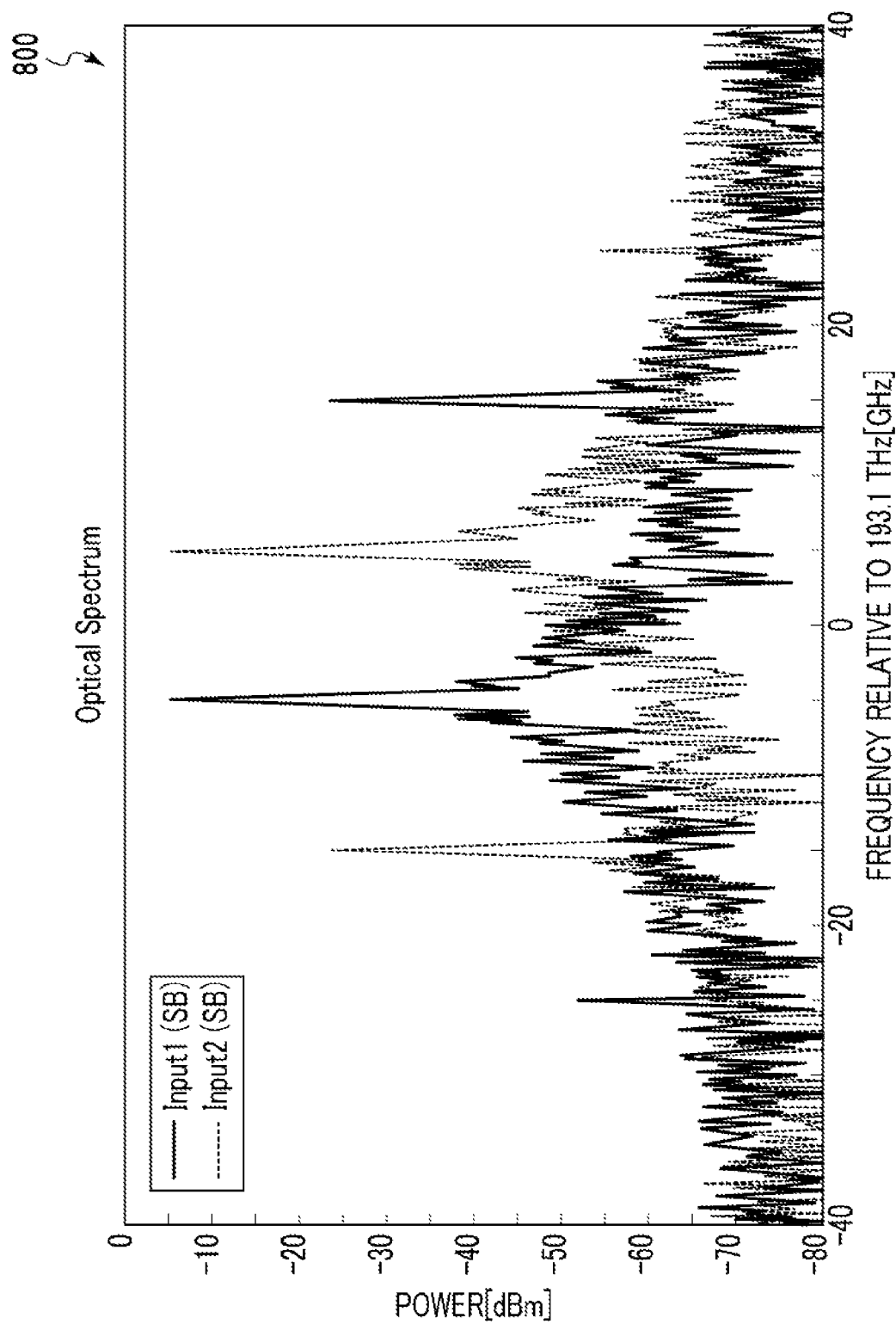
FIG. 8 is a diagram illustrating a simulation of an output signal obtained with an optical frequency shifter according to the second embodiment of the present invention.

FIG. 8 is a diagram illustrating simulation values for an optical spectrum obtained by an optical frequency shifter according to the second embodiment of the present invention. As illustrated in FIG. 8, two frequency-shifted optical outputs can still be obtained with such a configuration.

Third Embodiment

Figure 9:
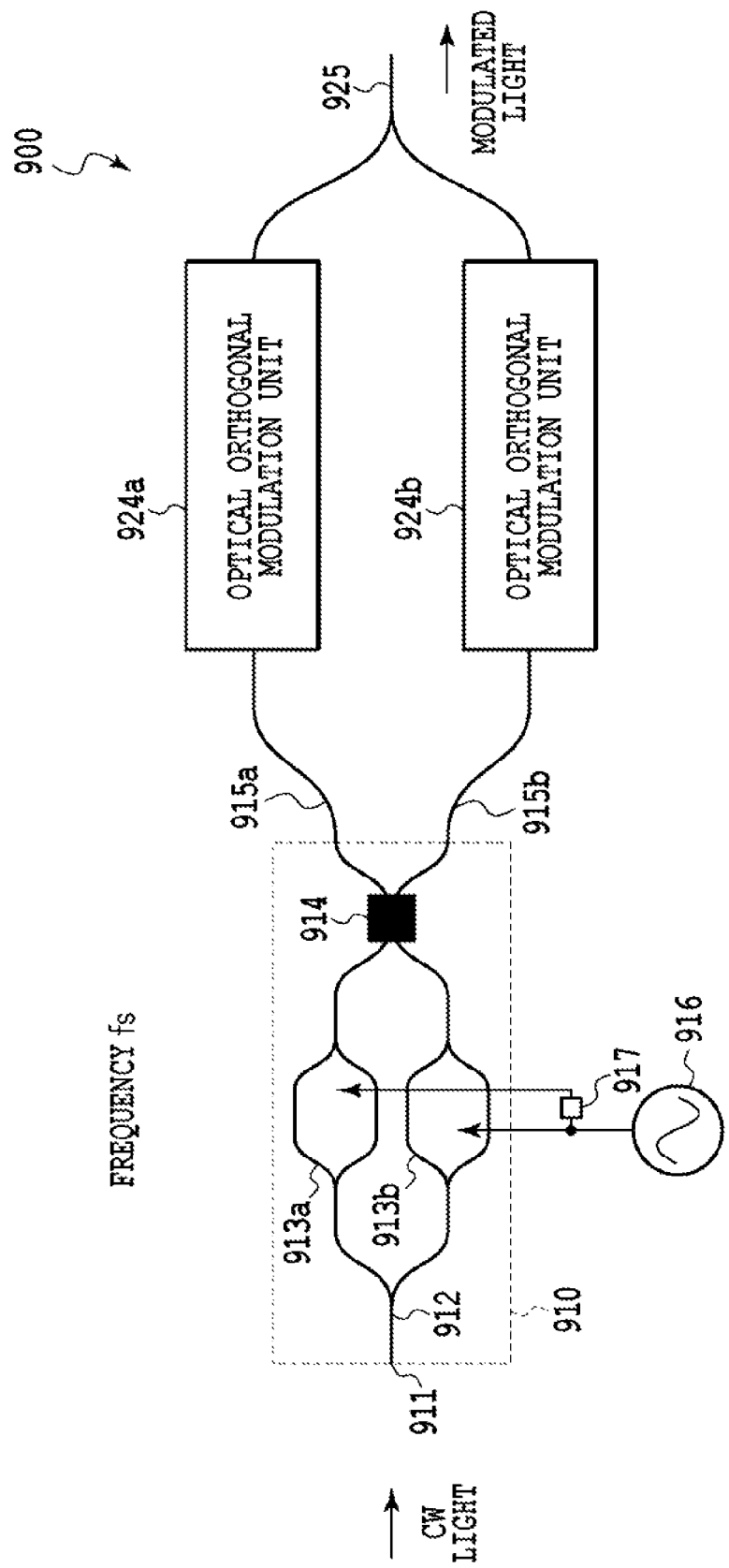
FIG. 9 is a diagram illustrating a configuration of an optical modulator according to the third embodiment of the present invention.

FIG. 9 illustrates a configuration of an optical modulator 900 according to the third embodiment of the present invention. The optical modulator 900 according to the third embodiment of the present invention illustrated in FIG. 9 comprises an optical frequency shifter 910, optical orthogonal modulation units 924a and 924b individually and optically connected to the two outputs of the optical frequency shifter 910, and a 2-input, 1-output optical coupler 925, optically connected to the outputs of the optical orthogonal modulation units 924a and 924b, that multiplexes the two outputs. Herein, an optical frequency shifter according to the first embodiment of the present invention is used as the optical frequency shifter 910.

Herein, in the optical modulator 900 according to the third embodiment of the present invention illustrated in FIG. 9, a Y-optical branch coupler is used as the 2-input, 1-output optical coupler 925. This is because taking such a configuration makes it possible to provide a 2-input, 1-output optical coupler with a wide range of operating wavelengths and a small splitting ratio instability. However, the present invention is not limited to this example, and for the 2-input, 1-output optical coupler, a 2-input, 1-output multimode interference optical coupler may also be used, and additionally a directional coupler, a 2-input, 2-output multimode interference optical coupler, or one of the output ports of a 2-input, 2-output optical coupler such as an asymmetric X-coupler may also be used.

In addition, in the optical modulator 900 according to the third embodiment of the present invention illustrated in FIG. 9, although the optical frequency shifter 210 according to the first embodiment of the present invention illustrated in FIG. 2 is used, obviously it is also acceptable to use the optical frequency shifter 610 according to a modification of the first embodiment of the present invention illustrated in FIG. 6, or to use the optical frequency shifter 710 according to the second embodiment of the present invention illustrated in FIG. 7.

Figure 10:
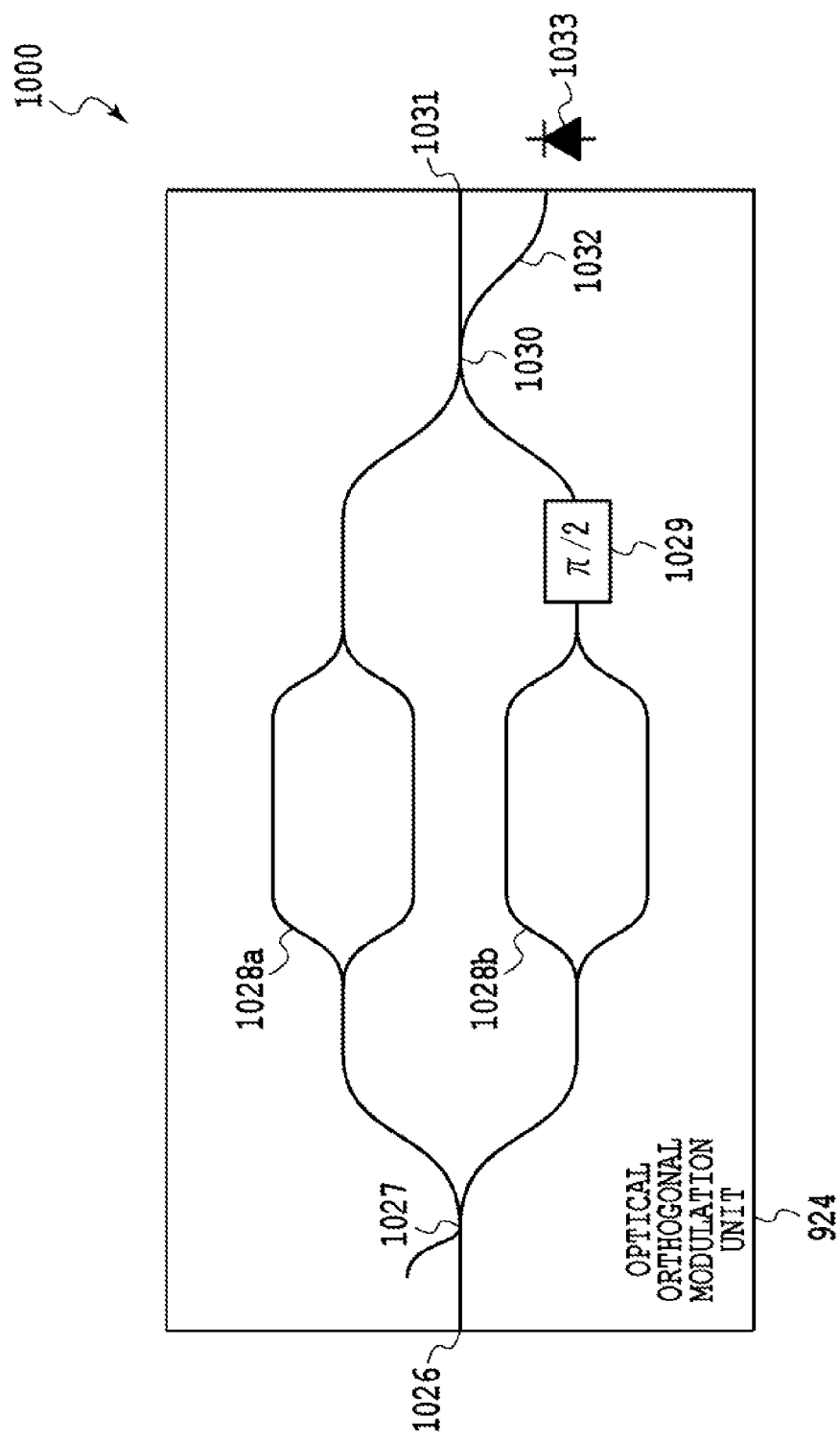
FIG. 10 is a diagram illustrating a configuration of an optical orthogonal modulation unit.

The optical orthogonal modulation units 924 in FIG. 9 may be realized with the configuration illustrated in FIG. 10. The optical orthogonal modulation unit 924 illustrated in FIG. 10 comprises an input optical port 1026, a 1-input, 2-output optical coupler 1027 optically connected to the input optical port 1026, two MZ modulation units 1028a and 1028b individually and optically connected to the two outputs of the 1-input, 2-output optical coupler, a 2-input, 2-output optical coupler 1030 optically connected to the outputs of the two MZ modulation units 1028a and 1028b, an output optical port 1031 optically connected to one of the outputs of the 2-input, 2-output optical coupler 1030, a monitor optical port 1032 optically connected to the other output, and an optical monitor 1033 optically connected to the monitor optical port 1032. Additionally, an optical delay line 1029 that applies a $\pi/2$ delay to light is provided between one of the MZ modulation units (in the case of FIG. 10, 1028b) and the 2-input, 2-output optical coupler 1030.

By taking such a configuration, light whose optical frequency is shifted by −f is guided to the optical orthogonal modulation unit 924a, while light whose optical frequency is shifted by +f is guided to the optical orthogonal modulation unit 924b, as described using the formulas in the first embodiment. Consequently, by setting the optical frequency shift magnitude f equal to half the symbol rate, an all-optical OFDM signal is obtained as the output of the 2-input, 1-output optical coupler 1025.

With this configuration, optical delayed interferometers for discriminating the ±f optical frequency components become unnecessary, thus making it possible to provide an optical modulator of small size, in which it is unnecessary to take into account changes in the characteristics of the delayed interferometers due to temperature. In addition, since there are no optical delayed interferometers, it is possible to provide an optical modulator that is not limited to operation on a specific wavelength grid, but is capable of operating on any frequency grid.

Fourth Embodiment

Figure 11:
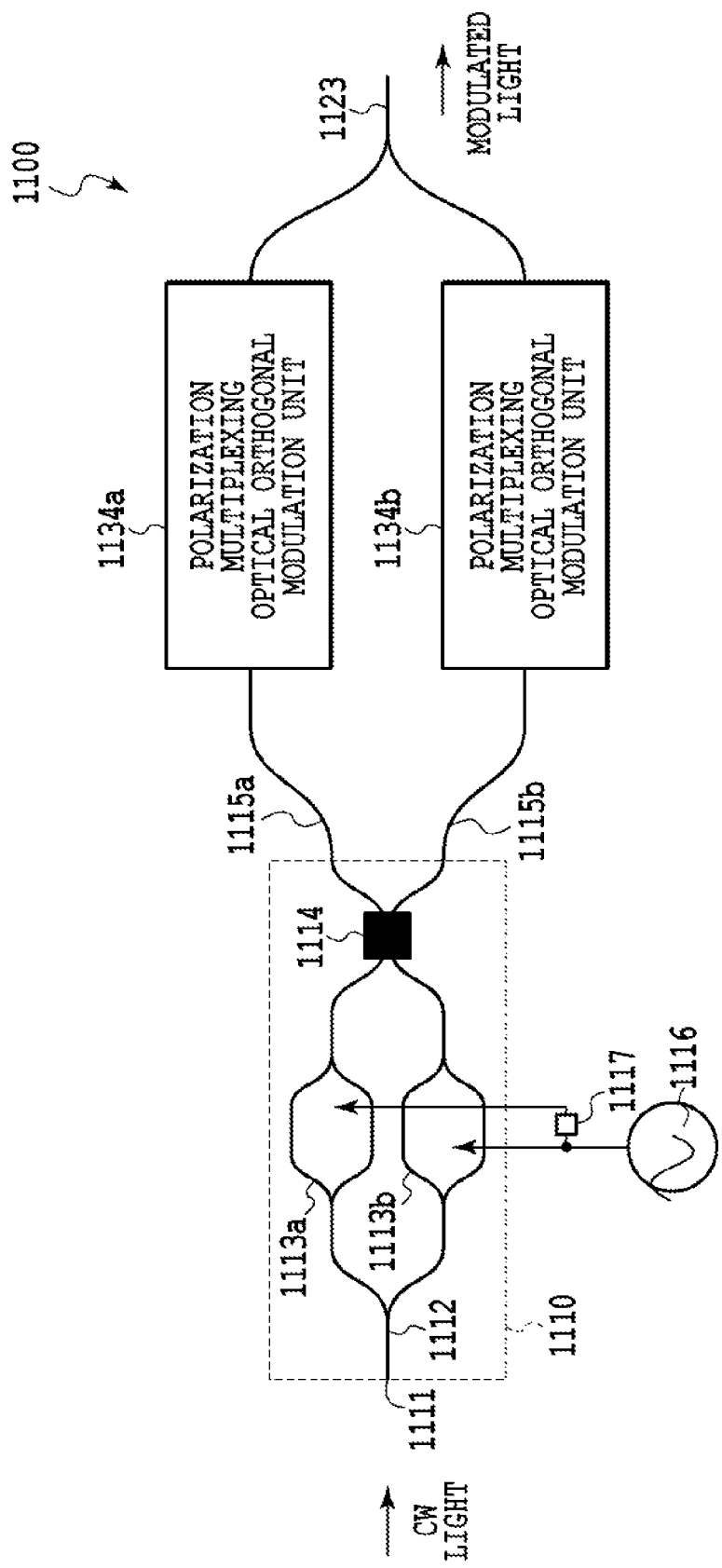
FIG. 11 is a diagram illustrating a configuration of an optical modulator according to the fourth embodiment of the present invention.

FIG. 11 illustrates a configuration of an optical modulator 1100 according to the fourth embodiment of the present invention. The optical modulator 1100 according to the fourth embodiment of the present invention illustrated in FIG. 11 comprises an optical frequency shifter 1110, polarization multiplexing optical orthogonal modulation units 1134a and 1134b individually and optically connected to the two outputs of the optical frequency shifter 1110, and a 2-input, 1-output optical coupler 1123, optically connected to the outputs of the optical orthogonal modulation units 1134a and 1134b, that multiplexes the two outputs. Herein, the optical frequency shifter 210 according to the first embodiment of the present invention is used as the optical frequency shifter 1110.

Herein, in the optical frequency shifter 1110 according to the fourth embodiment of the present invention illustrated in FIG. 11, a Y-optical branch coupler is used as the 2-input, 1-output optical coupler 1123. This is because taking such a configuration makes it possible to provide a 2-input, 1-output optical coupler with a wide range of operating wavelengths and a small splitting ratio instability. However, the present invention is not limited to this example, and for the 2-input, 1-output optical coupler, a 2-input, 1-output multimode interference optical coupler may also be used, and additionally a directional coupler, a 2-input, 2-output multimode interference optical coupler, or one of the output ports of a 2-input, 2-output optical coupler such as an asymmetric X-coupler may also be used.

In addition, in the optical modulator 1100 according to the fourth embodiment of the present invention illustrated in FIG. 11, although the optical frequency shifter 210 according to the first embodiment of the present invention illustrated in FIG. 2 is used, obviously it is also acceptable to use the optical frequency shifter 610 according to a modification of the first embodiment of the present invention illustrated in FIG. 6, or to use the optical frequency shifter 710 according to the second embodiment of the present invention illustrated in FIG. 7.

Figure 12:
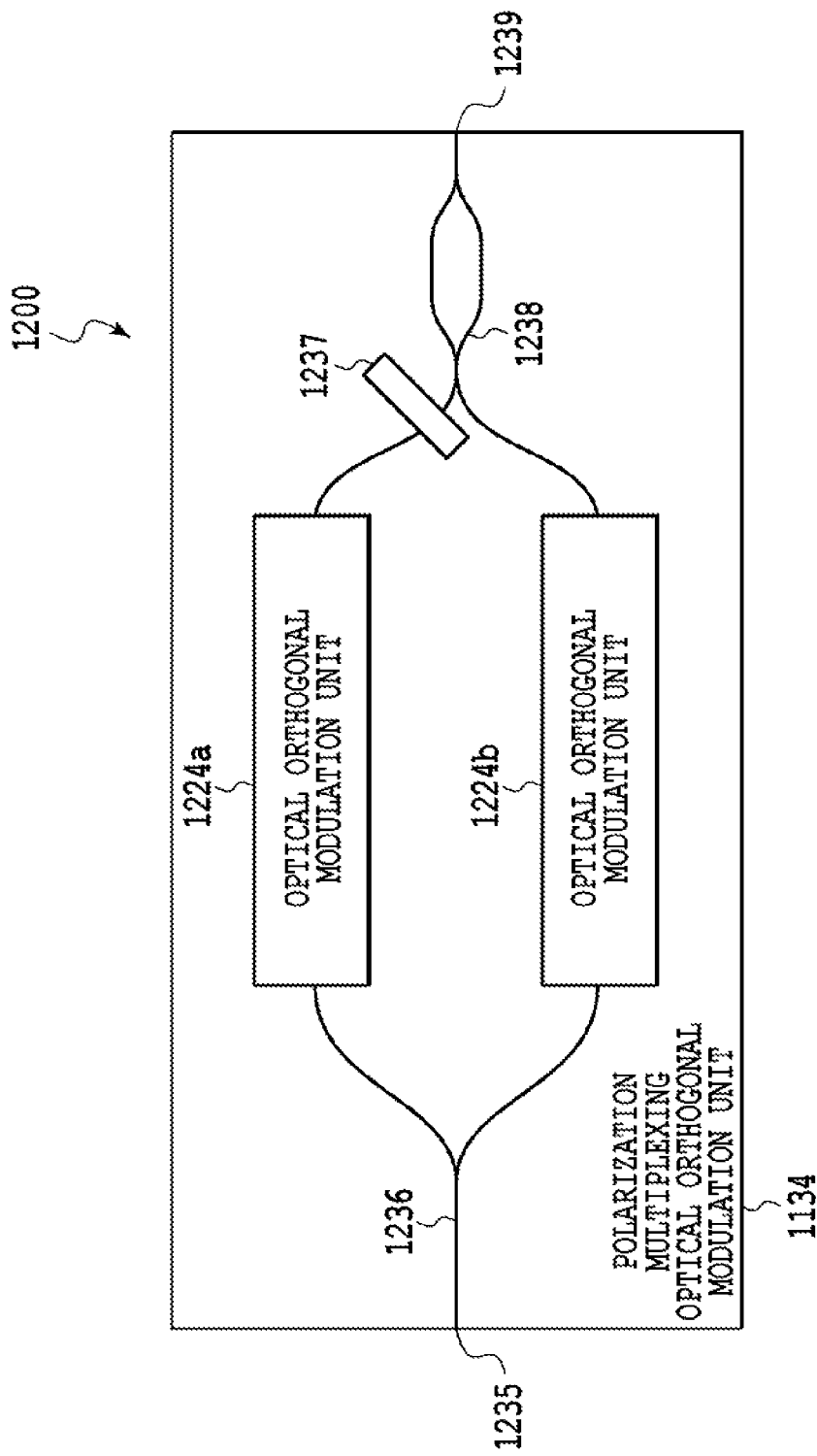
FIG. 12 is a diagram illustrating a configuration of a polarization multiplexing optical orthogonal modulation unit.

Furthermore, the polarization multiplexing optical orthogonal modulation units 1134 in FIG. 11 may be realized with the configuration illustrated in FIG. 12. The polarization multiplexing optical orthogonal modulation unit 1134 illustrated in FIG. 12 comprises an input optical port 1235, a 1-input, 2-output optical coupler 1236 optically connected to the input optical port 1235, optical orthogonal modulation units 1224a and 1224b individually and optically connected to the two outputs of the 1-input, 2-output optical coupler 1236, a 2-input, 1-output polarization multiplexer 1238 optically connected to the outputs of the two optical orthogonal modulation units 1224a and 1224b, and an output optical port 1239 optically connected to the output of the 2-input, 1-output polarization multiplexer 1238. Additionally a polarization converter 1237 that converts the optical polarization to an orthogonal polarization is provided between one of the optical orthogonal modulation units (in the case of FIG. 12, 1124a) and the polarization multiplexer 1238. Herein, the optical orthogonal modulation units 1224a and 1224b may take the configuration illustrated in FIG. 10.

By taking such a configuration, light whose optical frequency is shifted by −f is guided to the polarization multiplexing optical orthogonal modulation unit 1134a, while light whose optical frequency is shifted by +f is guided to the polarization multiplexing optical orthogonal modulation unit 1134b, as described using the formulas in the first embodiment. Consequently, by setting the optical frequency shift magnitude f equal to half the symbol rate, a polarization-multiplexed all-optical OFDM signal is obtained as the output of the 2-input, 1-output optical coupler 1123.

Fifth Embodiment

Figure 13:
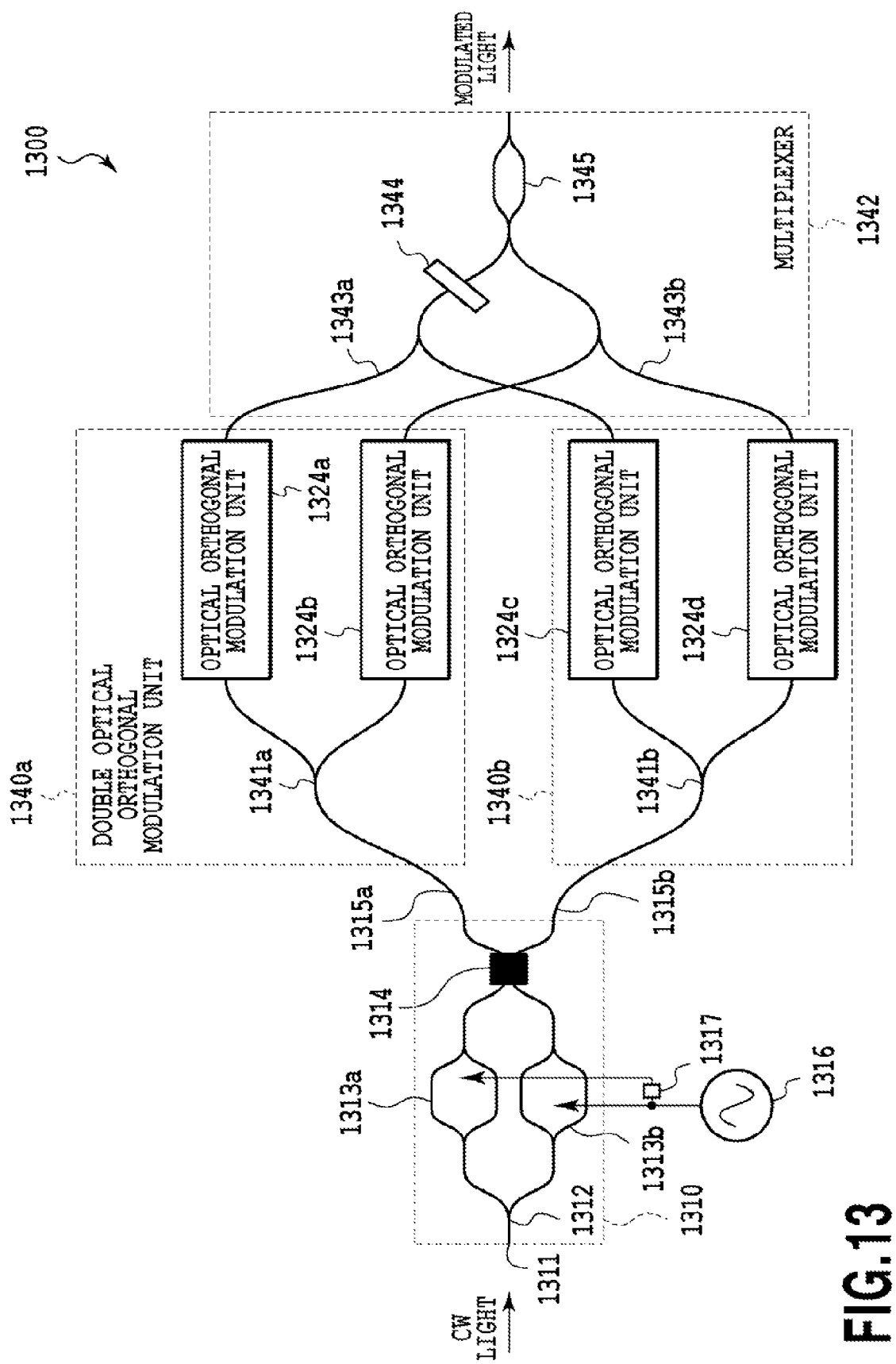
FIG. 13 is a diagram illustrating a configuration of an optical modulator according to the fifth embodiment of the present invention.

FIG. 13 illustrates a configuration of an optical modulator 1300 according to the fifth embodiment of the present invention. The optical modulator 1300 according to the fifth embodiment of the present invention illustrated in FIG. 13 comprises an optical frequency shifter 1310, double optical orthogonal modulation units 1340a and 1340b individually and optically connected to the two outputs of the optical frequency shifter 1310, and a multiplexer 1342, optically connected to the outputs of the double optical orthogonal modulation units 1340a and 1340b, that multiplexes the two outputs. Herein, the optical frequency shifter 210 according to the first embodiment of the present invention is used as the optical frequency shifter 1310.

In addition, the double optical orthogonal modulation unit 1340a comprises a Y-optical branch coupler 1341a that splits input light in two, and optical orthogonal modulation units 1324a and 1324b optically connected to the two outputs of the Y-optical branch coupler 1341a. The double optical orthogonal modulation unit 1340b comprises a Y-optical branch coupler 1341b that splits input light in two, and optical orthogonal modulation units 1324c and 1324d optically connected to the two outputs of the Y-optical branch coupler 1341b.

Furthermore, the multiplexer 1342 comprises a Y-optical branch coupler 1343a that multiplexes one of respective outputs of the double optical orthogonal modulation units 1340a and 1340b, Y-optical branch coupler 1343b that multiplexes the other respective output of the double optical orthogonal modulation units 1340a and 1340b, and a polarization multiplexer 1345 that polarization multiplexes the outputs of the Y-optical branch couplers 1343a and 1343b. Also, a polarization converter 1344 that converts the optical polarization to an orthogonal polarization is provided between one of the Y-optical branch couplers 1343a and 1343b (in this case, 1343a) and the polarization multiplexer 1345.

Herein, in the optical modulator 1100 according to the fifth embodiment of the present invention illustrated in FIG. 11, although the optical frequency shifter 210 according to the first embodiment of the present invention illustrated in FIG. 2 is used, obviously it is also acceptable to use the optical frequency shifter 610 according to a modification of the first embodiment of the present invention illustrated in FIG. 6, or to use the optical frequency shifter 710 according to the second embodiment of the present invention illustrated in FIG. 7.

By taking such a configuration, light whose optical frequency is shifted by −f is guided to the double polarization multiplexing optical orthogonal modulation unit 1340*a*, while light whose optical frequency is shifted by +f is guided to the double polarization multiplexing optical orthogonal modulation unit 1340*b*, as described using the formulas in the first embodiment. Consequently, by setting the optical frequency shift magnitude f equal to half the symbol rate, a polarization-multiplexed all-optical OFDM signal is obtained as the output of the multiplexer 1342.

Figure 14:
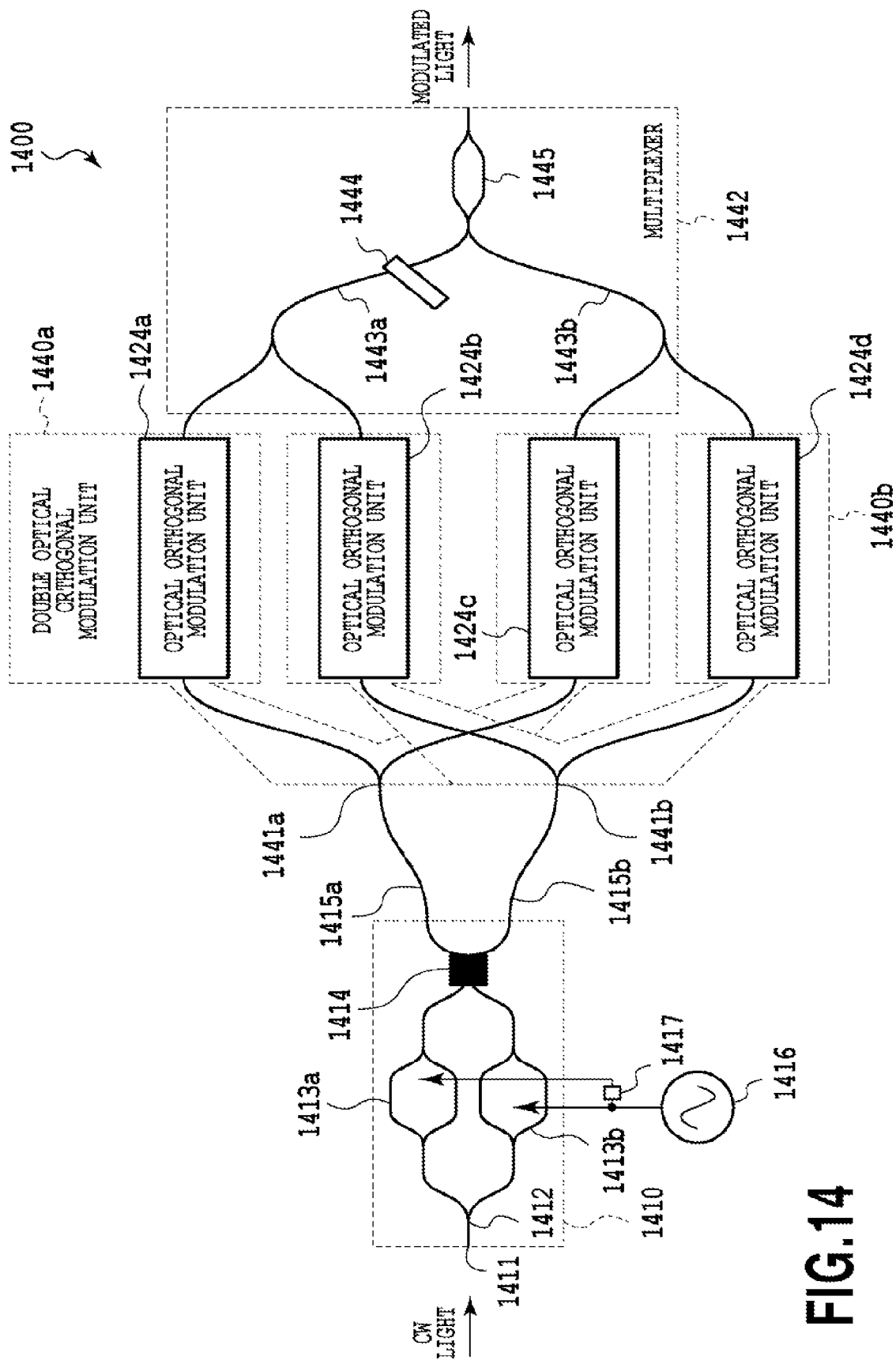
FIG. 14 is a diagram illustrating a configuration of an optical modulator according to a modification of the fifth embodiment of the present invention.

Note that besides the configuration illustrated in FIG. 13, the configuration of the fifth embodiment of the present invention illustrated in FIG. 13 obviously can still exhibit the advantageous effects of the present invention even if the spatial layout of the double optical orthogonal modulation units is disposed so as to be nested, as in FIG. 14.

REFERENCE SIGNS LIST

210, 610, 710, 910, 1110, 1310, 1410 Optical frequency shifter
211, 611, 711, 911, 1026, 1111, 1235, 1311, 1411 Input optical port 212, 612, 712, 912, 1112, 1027, 1236, 1312, 1341*a*, 1341*b*, 1412, 1441*a*, 1441*b* 1-input, 2-output optical coupler
213*a*, 213*b*, 613*a*, 613*b*, 713*a*, 713*b*, 913*a*, 913*b*, 1028*a*, 1028*b*, 1113*a*, 1113*b*, 1313*a*, 1313*b*, 1413*a*, 1413*b* Mach-Zehnder modulation unit
214, 614, 714, 914, 1030, 1114, 1314, 1414 2-input, 2-output optical coupler
215*a*, 215*b*, 615*a*, 615*b*, 715*a*, 715*b*, 915*a*, 915*b*, 1031, 1115*a*, 1115*b*, 1239, 1315*a*, 1315*b*, 1415*a*, 1415*b* Output optical port
216, 616, 716, 916, 1116, 1316, 1416 Signal generator
217, 617, 722, 917, 1117, 1317, 1417 Electrical delay line
218*a*, 218*b*, 618*a*, 618*b*, 718 Electrical amp
619, 1029 Optical delay line
720*a*, 720*b* Modulation electrode
721 Electrical line
723 Terminating resistor
924*a*, 924*b*, 1224*a*, 1224*b*, 1324*a*, 1324*b*, 1324*c*, 1324*d*, 1424*a*, 1424*b*, 1424*c*, 1424*d* Optical orthogonal modulation unit
925, 1123, 1343*a*, 1343*b*, 1443*a*, 1443*b* 2-input, 1-output optical coupler
1032 Monitor optical port
1033 Optical monitor
1134*a*, 1134*b* Polarization multiplexing optical orthogonal modulation unit
1237, 1344, 1444 Polarization converter
1238, 1345, 1445 Polarization multiplexer
1340*a*, 1340*b*, 1440*a*, 1440*b* Double optical orthogonal modulation unit
1342, 1442 Multiplexer

The invention claimed is:

1. An optical frequency shifter comprising:
    one input optical port;
    a 1-input, 2-output optical coupler optically connected to the one input port;
    two Mach-Zehnder modulation units individually optically connected to the two outputs of the 1-input, 2-output optical coupler;
    a 2-input, 2-output optical coupler optically connected to the individual outputs of the two Mach-Zehnder modulation units; and
    two output optical ports optically connected to the two outputs of the 2-input, 2-output optical coupler;
    wherein the two Mach-Zehnder modulation units are driven by periodic waveforms at the same frequency whose phases differ from each other by $(2p+1)\pi/2$ (p: integer).

2. The optical frequency shifter according to claim 1, wherein the biases of the two Mach-Zehnder modulation units are adjusted such that the individual outputs become 0 when not driven.

3. The optical frequency shifter according to claim 1, wherein, when the half-wave voltage of the Mach-Zehnder modulation units is $V\pi$, the full voltage amplitude values of the periodic waveforms that drive the Mach-Zehnder modulation units are within 60% to 120% inclusive of $2V\pi$.

4. The optical frequency shifter according to claim 1, wherein the 1-input, 2-output optical coupler comprises a Y-optical branch coupler, and the 2-input, 2-output optical coupler comprises a 2-input, 2-output multimode interference optical coupler.

5. The optical frequency shifter according to claim 1, wherein a modulation electrode provided in one Mach-Zehnder modulation unit from between the two Mach-Zehnder modulation units is cascade-connected to a modulation electrode provided in the other Mach-Zehnder modulation unit, and wherein a delay of $\pi/2$ in the periodic waveform is provided on an electrical line that connects the modulation electrode provided in the one Mach-Zehnder modulation unit and the modulation electrode provided in the other Mach-Zehnder modulation unit.

6. The optical frequency shifter according to claim 5, wherein the modulation electrode provided in one of the two Mach-Zehnder modulation units that is closer to the electrical input has shorter length, and the modulation electrode provided in the other modulation unit that is farther from the electrical input has longer length.

7. An optical modulator for generating an optical signal, comprising:
    a 1-input, 2-output optical frequency shifter unit;
    two optical modulation units individually optically connected to the two outputs of the 1-input, 2-output optical frequency shifter unit; and
    an optical multiplexing unit optically connected to the individual outputs of the two optical modulation units;
    wherein the 1-input, 2-output optical frequency shifter unit comprises:
    one input optical port,
    a 1-input, 2-output optical coupler optically connected to the one input port,
    two Mach-Zehnder modulation units individually optically connected to the two outputs of the 1-input, 2-output optical coupler,
    a 2-input, 2-output optical coupler optically connected to the individual outputs of the two Mach-Zehnder modulation units, and
    two output optical ports optically connected to the two outputs of the 2-input, 2-output optical coupler, and
    wherein the two Mach-Zehnder modulation units are driven by periodic waveforms at the same frequency whose phases differ from each other by $(2p+1)\pi/2$ (p: integer).

8. The optical modulator according to claim 7, wherein the two modulation units are individual optical orthogonal modulation units, and the optical multiplexing unit is a 2-input, 1-output optical coupler.

9. The optical modulator according to claim 7, wherein the two modulation units are individual polarization multiplexing optical orthogonal modulation units, and the optical multiplexing unit is a 2-input, 1-output optical coupler.

10. The optical modulator according to claim 7, wherein the two modulation units comprise 1-input, 2-output optical couplers and double optical orthogonal modulation units individually optically connected to the two outputs of the 1-input, 2-output optical coupler, and wherein the optical multiplexer comprises:
- a first 2-input, 1-output optical coupler that multiplexes one output from each of the two double optical orthogonal modulation units,
- a second 2-input, 1-output optical coupler that multiplexes the other output from each of the two double optical orthogonal modulation units, and
- a polarization multiplexer that polarization multiplexes the output of the first optical coupler and the output of the second optical coupler, and wherein a polarization converter is provided between one of either the output of the first optical coupler and the output of the second optical coupler, and the polarization multiplexer.

11. The optical modulator according to claim 7, wherein the biases of the two Mach-Zehnder modulation units provided in the optical frequency shifter are adjusted such that the individual outputs become 0 when not driven.

12. The optical modulator according to claim 7, wherein, when the half-wave voltage of the Mach-Zehnder modulation units provided in the optical frequency shifter is $V\pi$, the full voltage amplitude values of the periodic waveforms that drive the Mach-Zehnder modulation units provided in the optical frequency shifter are within 60% to 120% inclusive of $2V\pi$.

13. The optical modulator according to claim 7, wherein the 1-input, 2-output optical coupler provided in the optical frequency shifter is a Y-optical branch coupler, and the 2-input, 2-output optical coupler provided in the optical frequency shifter is a 2-input, 2-output multimode interference optical coupler.

14. The optical modulator according to claim 7, wherein a modulation electrode provided in one Mach-Zehnder modulation unit from between the two Mach-Zehnder modulation units provided in the optical frequency shifter is cascade-connected to a modulation electrode provided in the other Mach-Zehnder modulation unit provided, and wherein a delay of $\pi/2$ in the periodic waveform that drives the optical frequency shifter is provided on an electrical line that connects the modulation electrode provided in the one Mach-Zehnder modulation unit provided in the optical frequency shifter and the modulation electrode provided in the other Mach-Zehnder modulation unit.

15. The optical modulator according to claim 14, wherein the modulation electrode provided in one of the two Mach-Zehnder modulation units provided in the optical frequency shifter that is closer to the electrical input has shorter length, and the modulation electrode provided in the other Mach-Zehnder modulation unit that is farther from the electrical input has longer length.

* * * * *